US011590612B2

United States Patent
Barhorst et al.

(10) Patent No.: US 11,590,612 B2
(45) Date of Patent: Feb. 28, 2023

(54) MICRO-POROUS TUBULAR WELDING WIRE

(71) Applicant: Hobart Brothers LLC, Troy, OH (US)

(72) Inventors: Steven E. Barhorst, Sidney, OH (US); Joseph C. Bundy, Piqua, OH (US)

(73) Assignee: HOBART BROTHERS LLC, Troy, OH (US)

(*) Notice: Subject to any disclaimer, the term of this patent is extended or adjusted under 35 U.S.C. 154(b) by 39 days.

(21) Appl. No.: 16/394,978

(22) Filed: Apr. 25, 2019

(65) Prior Publication Data

US 2019/0329362 A1 Oct. 31, 2019

Related U.S. Application Data

(60) Provisional application No. 62/663,448, filed on Apr. 27, 2018.

(51) Int. Cl.
*B23K 35/02* (2006.01)
*B23K 35/40* (2006.01)
(Continued)

(52) U.S. Cl.
CPC ........ *B23K 35/0266* (2013.01); *B23K 35/368* (2013.01); *B23K 35/406* (2013.01); *B23K 35/365* (2013.01); *B23K 2035/408* (2013.01)

(58) Field of Classification Search
CPC B23K 35/0266; B23K 35/368; B23K 35/406; B23K 2035/408; B23K 35/0255;
(Continued)

(56) References Cited

U.S. PATENT DOCUMENTS 2,073,465 A * 3/1937 Deitz, Jr. ............. B23K 35/406
72/263
2,087,225 A * 7/1937 Austin ................ B23K 9/1336
219/137 WM
(Continued)

FOREIGN PATENT DOCUMENTS

CA 2204344 12/1997
CN 1181724 5/1998
(Continued)

OTHER PUBLICATIONS

Machine English Translation of JPH0663792A (Year: 1994).*
(Continued)

*Primary Examiner* — Tu B Hoang
*Assistant Examiner* — Erwin J Wunderlich
(74) *Attorney, Agent, or Firm* — McAndrews Held & Malloy, Ltd.

(57) ABSTRACT

The present disclosure is directed to a tubular welding electrode with a sheath encapsulating a flux core, where the sheath comprises a number of added pores. The added pores may provide escape paths for the outgassing of moisture and hydrocarbons from the flux core when the tubular welding electrode is baked. In addition, the added pores may be used to hold a liquid, such as a lubricant. The added pores may be introduced using a process such as laser drilling or chemical etching, and may be added to a strip of sheath material prior to forming the strip into a tubular welding electrode.

20 Claims, 11 Drawing Sheets

FIG. 4A

(51) Int. Cl.
*B23K 35/368* (2006.01)
*B23K 35/365* (2006.01)

(58) Field of Classification Search
CPC .. B23K 35/0261; B23K 35/362; B23K 35/40; B23K 35/402
USPC .................................................. 219/145.22
See application file for complete search history.

(56) References Cited

U.S. PATENT DOCUMENTS

| | | | | |
|---|---|---|---|---|
| 4,364,770 | A * | 12/1982 | Douchy | B65B 9/067 75/304 |
| 4,832,742 | A * | 5/1989 | Ototani | B23K 35/0266 75/304 |
| 4,956,010 | A * | 9/1990 | Douchy | C21C 7/0056 75/304 |
| 6,079,243 | A * | 6/2000 | Inoue | B21C 1/003 72/41 |
| 6,933,468 | B2 * | 8/2005 | Keegan | B23K 35/0266 219/145.22 |
| 7,858,204 | B2 * | 12/2010 | Campbell | B23K 35/406 428/626 |
| 9,579,751 | B2 * | 2/2017 | Burt | B23K 35/3613 |
| 9,731,383 | B2 * | 8/2017 | Campbell | B23K 35/0227 |
| 2005/0044687 | A1 * | 3/2005 | Matsuguchi | B21C 37/042 29/455.1 |
| 2007/0039937 | A1 * | 2/2007 | Jang | B23K 35/02 219/145.22 |
| 2009/0014093 | A1 * | 1/2009 | Campbell | B23K 35/406 228/56.3 |
| 2012/0074111 | A1 | 3/2012 | Sasabe | |
| 2012/0241432 | A1 | 9/2012 | Lin | |
| 2014/0008416 | A1 * | 1/2014 | Visser | B23P 13/04 228/56.3 |

FOREIGN PATENT DOCUMENTS

| | | | | |
|---|---|---|---|---|
| CN | 101058129 | | 10/2007 | |
| CN | 206356753 | | 7/2017 | |
| JP | H0270398 | | 3/1990 | |
| JP | H0663792 | A * | 3/1994 | ............. B23K 26/00 |
| JP | H0825064 | B2 * | 3/1996 | ............. C21D 1/613 |
| KR | 101181214 | B1 * | 9/2012 | ............. C21D 1/613 |
| WO | WO-2016111705 | A1 * | 7/2016 | ............. C21D 1/613 |
| WO | 2017106131 | | 6/2017 | |

OTHER PUBLICATIONS

Machine English Translation of JPH0825064B2 (Year: 1996).*
Machine English Translation of KR101181214B1 (Year: 2012).*
ISA, "International Search Report and Written Opinion," issued in connection with Application No. PCT/US2019/029365, dated Jul. 22, 2019, 14 pages.

* cited by examiner

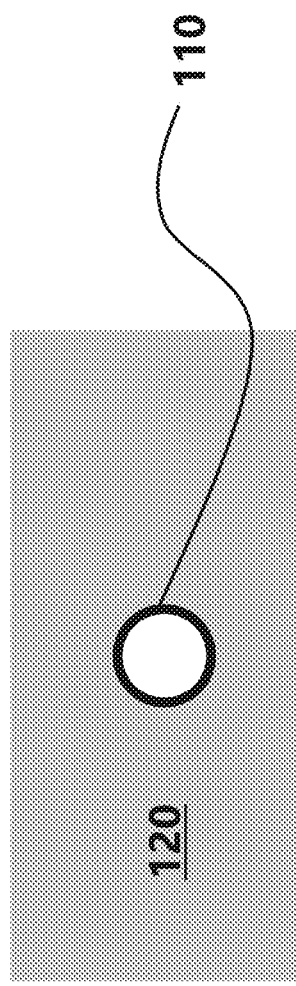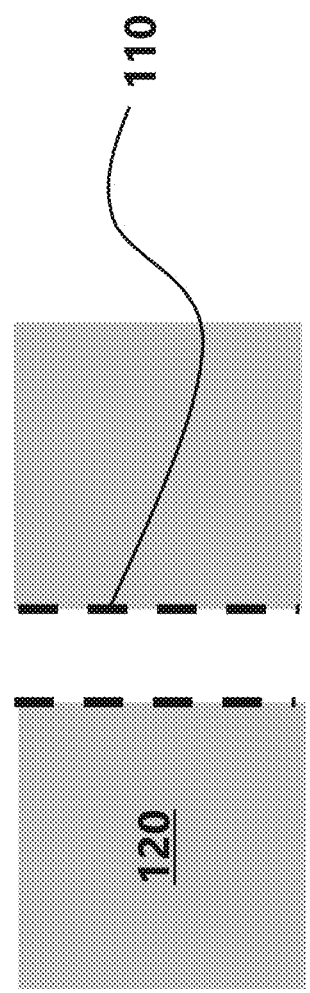

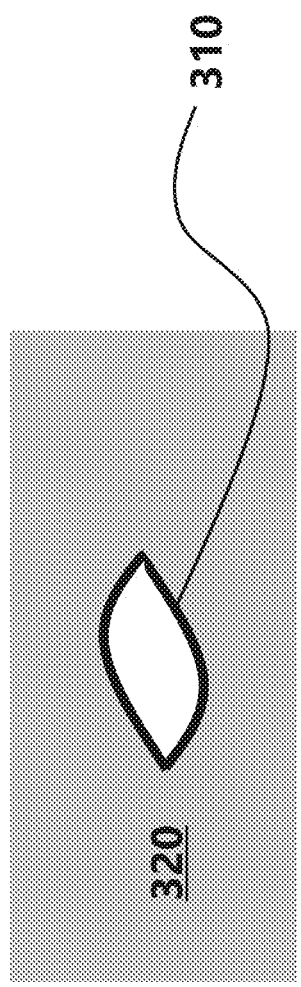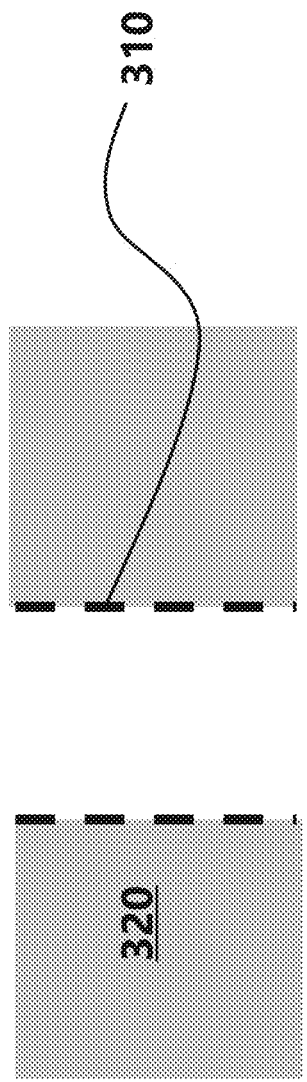
FIG. 3A
FIG. 3B

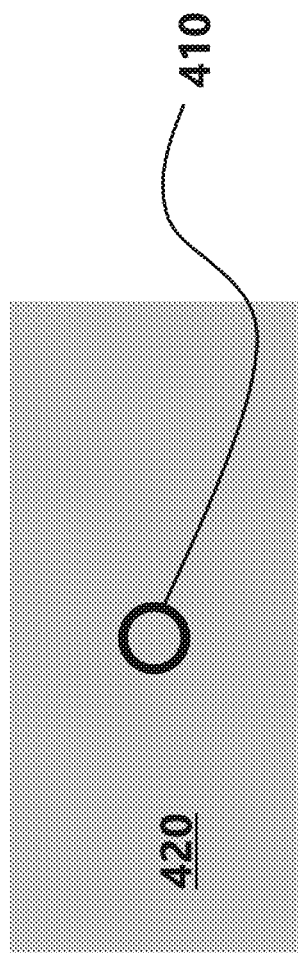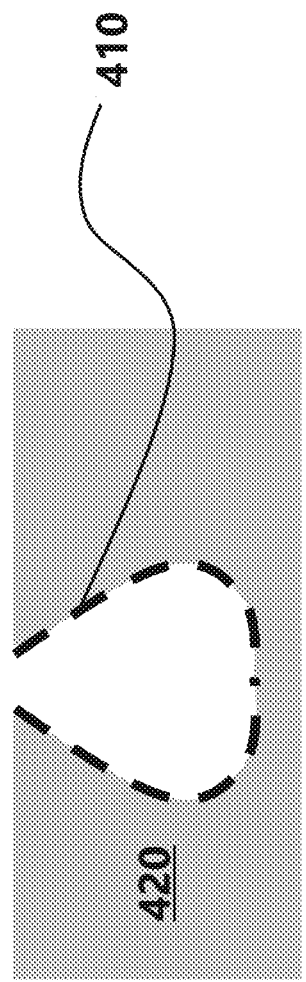

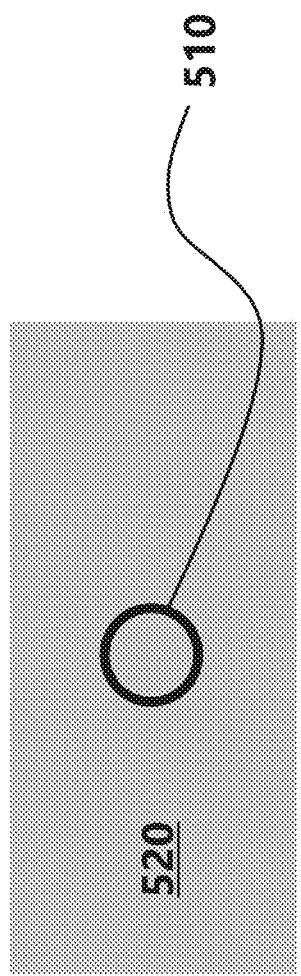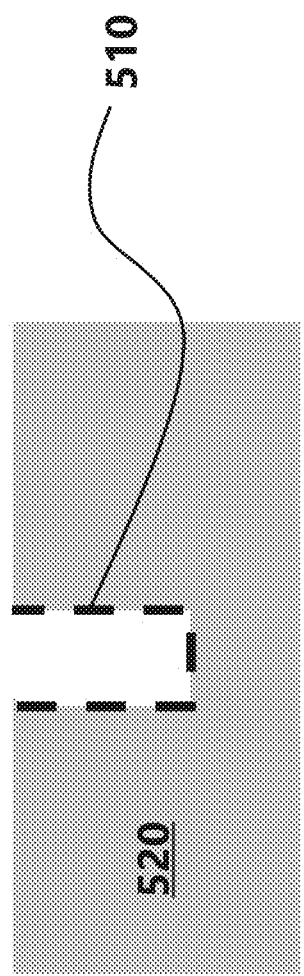

MICRO-POROUS TUBULAR WELDING WIRE

CROSS-REFERENCE TO RELATED APPLICATION

This application claims benefit of priority from U.S. provisional patent application No. 62/663,448, filed Apr. 27, 2018, which is hereby incorporated by reference in its entirety herein.

FIELD

The present disclosure generally relates to welding wire having a sheath containing micro-pores or micro-perforations.

BACKGROUND

Hydrogen associated cracking (also known as cold cracking) is a problem that can arise during welding of tubular welding wire electrodes, particularly for steel alloy welding wire electrodes. There is a desire for reduced diffusible hydrogen in all tubular wire electrode types, but this desire is especially felt in unbaked gasless tubular welding electrodes, which do not undergo a baking process step during manufacture that otherwise drives out moisture and hydrocarbons. For aluminum alloys, there is a similar hydrogen problem, but the defect is found in the form of porosity.

SUMMARY

According to one aspect of the present disclosure, a tubular welding electrode having a length and a circumference comprises a granular flux fill core extending substantially along the length of the electrode and a sheath extending substantially along the length of the electrode and substantially surrounding and substantially encasing the granular flux fill core. The sheath comprises a plurality of pores distributed around the circumference and along the length of the tubular welding electrode. The pores may have an average pore size of between 1-30 microns. The sheath may be a steel material or an aluminum material.

According to another aspect of the present disclosure, a method for producing a tubular welding electrode may comprise the steps of: providing a strip of a metallic material having a length and a width; creating a plurality of pores extending at least partially through the width of the strip; forming the strip into a "U" shape along the length; filling the "U" shape of the strip with a granular powder flux; and mechanically closing the "U" shape to form a tubular welding electrode containing a core of the granular powder flux. The pores may have an average pore size of between 1-30 microns. The method may comprise a further step of drawing the tubular welding electrode to a desired diameter. The method may also comprise a further step of baking the tubular welding electrode to allow moisture and hydrocarbons from the granular powder flux to diffuse out of the tubular welding electrode. The pores may be created in the strip by laser drilling or chemical etching. The mechanical closing may involve forming a butt or overlap seam.

According to another aspect of the present disclosure, a method for producing a tubular welding electrode may comprise the steps of: providing a strip of a metallic material having a length and a width; creating a plurality of pores extending at least partially through the width of the strip; forming the strip into a substantially circular shape along the length; welding the strip to form a tube sealed along the length; and filling the tube with a granular powder flux to form a tubular welding electrode. The pores may have an average pore size of between 1-30 microns. The method may comprise a further step of drawing the tubular welding electrode to a desired diameter. The method may also comprise a further step of baking the tubular welding electrode to allow moisture and hydrocarbons from the granular powder flux to diffuse out of the tubular welding electrode. The pores may be created in the strip by laser drilling or chemical etching.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The following is a description of the examples depicted in the accompanying drawings. The figures are not necessarily to scale, and certain features and certain views of the figures may be shown exaggerated in scale or in schematic in the interest of clarity or conciseness.

FIG. 1A is a drawing showing a top plan view of the entrance of a pore;

FIG. 1B is a drawing showing a side cross section view of the pore shown in FIG. 1A;

FIG. 3A is a drawing showing a top plan view of the entrance of a pore;

FIG. 3B is a drawing showing a side cross section view of the pore shown in FIG. 3A;

FIG. 4A is a drawing showing a top plan view of the entrance of a pore;

FIG. 4B is a drawing showing a side cross section view of the pore shown in FIG. 4A;

FIG. 5A is a drawing showing a top plan view of the entrance of a pore;

FIG. 5B is a drawing showing a side cross section view of the pore shown in FIG. 5A;

Figure 2A:
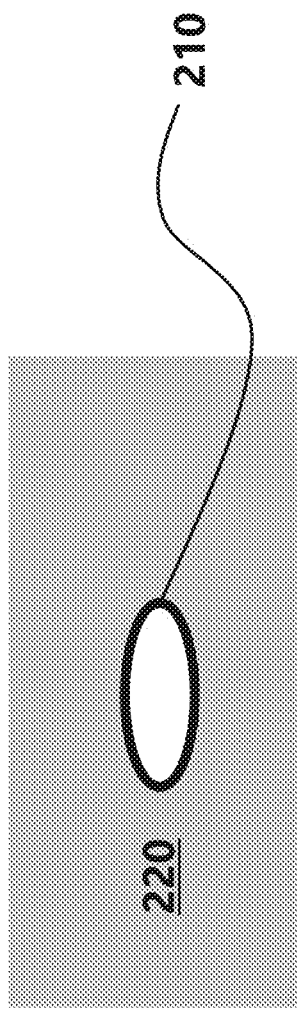
FIG. 2A is a drawing showing a top plan view of the entrance of a pore.

The foregoing summary, as well as the following detailed description, will be better understood when read in conjunction with the figures. It should be understood that the claims are not limited to the arrangements and instrumentality shown in the figures. Furthermore, the appearance shown in the figures is one of many ornamental appearances that can be employed to achieve the stated functions of the apparatus.

DETAILED DESCRIPTION

In the following detailed description, specific details may be set forth in order to provide a thorough understanding of embodiments of the present disclosure. However, it will be clear to one skilled in the art when disclosed examples may be practiced without some or all of these specific details. For the sake of brevity, well-known features or processes may not be described in detail. In addition, like or identical reference numerals may be used to identify common or similar elements.

A conventional process used to manufacture tubular welding electrodes incorporates the use of a strip of preferred dimensions. The strip is formed into a "U" shape in a forming mill for the purpose of adding a granular powder flux fill to become the core. After the flux fill has been added, the "U" shaped tube is then mechanically closed; typically in a butt or overlap seam. The seam in the wire with this process is purely mechanical and not sealed. After mechanical closure of the seam, the tubular wire electrode is then subsequently drawn to desired diameter, baked (or unbaked depending on product design), and packaged.

The escape path of moisture and hydro-carbons from the flux core powder materials internal to the tubular electrode is currently limited to occur only through the non-sealed folded seam (butt or overlap) during welding and the baking process step for tubular wires that are baked. This "open" seam is located in a single "clock position" (for example, in the 12:00 o'clock position) thus allowing only one escape path through the sheath throughout the circumference of the tubular wire electrode. Thus, there is a desire for a tubular welding wire electrode that allows escape from around the full circumference of the wire electrode.

Another conventional process method used to manufacture tubular welding electrodes is called the "seamless process". This manufacturing method incorporates use of strip that is formed into a relatively large (e.g., approx. ⅝ inch) diameter fully circumferential round/tube shape. The longitudinal seam is then welded and thus 100% sealed together—thus the term "seamless." The flux is then added to this "seamless tube" in an offline vibratory filling process. The wire electrode is then drawn in a series of annealing and drawing reduction steps to a final desired wire diameter. During welding with "seamless" tubular welding electrodes there is no escape path for the internal flux core powder material moisture and hydro-carbons to escape through the sheath anywhere on the circumference. Thus, there is a desire for a tubular welding wire electrode produced by a "seamless process" that allows escape from around the full circumference of the wire electrode.

The present disclosure relates to the use of small pores or perforations (which may be referred to as micro-pores or micro-perforations) contained in the strip used to manufacture and draw both "folded" and "seamless" tubular welding electrodes for the purpose of providing enhanced outgassing during welding. This enhanced outgassing is particularly effective, needed, and useful in all steel and aluminum alloy types. It is also beneficial for all tubular constructed wire alloys and types. For example, besides steel and aluminum alloy types, micro-pores may be introduced into other alloys such as stainless steel alloys, nickel-based alloys, and copper-based alloys. Welding wire electrodes according to the present disclosure may be referred to as micro-porous.

A "pore" (or "perforation") in the tubular wire sheath may be considered a volume contained within the sheath which does not contain sheath material. As such, the pore may contain air, a gas (other than air), a vacuum, or a liquid. Typically, the pore will extend from either an inner or outer surface of the sheath, which has a width. A pore may extend partially or fully through the width of the sheath.

Pores may be distributed around the circumference and along the length of the sheath. At least for purposes of distribution of pores around the sheath, the sheath may be considered to have a "circumference" regardless of whether it has a circular cross-section, a "U"-shaped cross-section, a "C"-shaped cross-section, or an oval cross-section. Pores need not be distributed in any particular pattern. Distributing pores "around" the circumference means that pores may be located at different locations radially around the sheath. Distributing pores "along" the sheath means that pores may be located at different locations axially along the length of the sheath. Pores may extend fully through the sheath, or partially through the sheath (either from an inner or outer surface of the sheath), or both. In some embodiments, it may be advantageous to distribute the pores evenly (or approximately evenly) around and along the sheath, such that the average pore distribution is approximately equal throughout the sheath. In other embodiments, it may be advantageous to have different average pore distributions at different locations around or along the sheath in order to alter the properties (such as the relative outgassing properties) of the sheath.

Introducing small pores into the tubular wire sheath creates additional escape paths for the outgassing of moisture and hydrocarbons from the flux core powder materials contained within both gasless and gas-shielded tubular welding wire electrodes during welding. For example, the pores may allow gases such as hydrogen and carbon dioxide to escape. Pores may be useful for outgassing regardless of whether the wires are baked or unbaked prior to welding.

Also, introducing small pores into the tubular wire sheath creates additional escape paths for the outgassing of moisture and hydrocarbons from the flux core powder materials contained within tubular welding wire electrodes during a wire baking process. For example, the tubular welding electrodes may be baked in-line by resistive preheat baking.

Depending on the size and number of pores or perforations, the pores may serve to provide increased $I^2R$ resistance heating of the tubular wire electrode, which may enhance deposition rates and reduce arc power requirements.

Micro-porous welding wire electrodes may be used with a sheath surrounding a granular powder flux core or a solid metal core.

In terms of pore size, disclosed example welding wires have pores that are both large enough to allow for outgassing while also small enough to retain the granular powder flux in the core of the wire electrode. It may be desirable to reduce the pore size where practical. For example, smaller pores will limit the possibility that the granular powder flux can escape through the pores, and will still remain practically useful so long as the pores are large enough to allow for outgassing. For example, the pore sizes may be approximately: 1 to 30 microns, or 5 to 20 microns, or 10 microns. The pore size may be considered the pore diameter (for circular/cylindrical pores) or a pore width (for non-circular or non-cylindrical pores). The pore size may be measured as an average pore size, which could, for example, be calculated as a median pore size. Alternatively, the average pore size could be calculated as a mean pore size. The pores may be a range of different sizes or all the same approximate size. The entrance pore size does not need to equal the exit pore size.

Figure 2B:
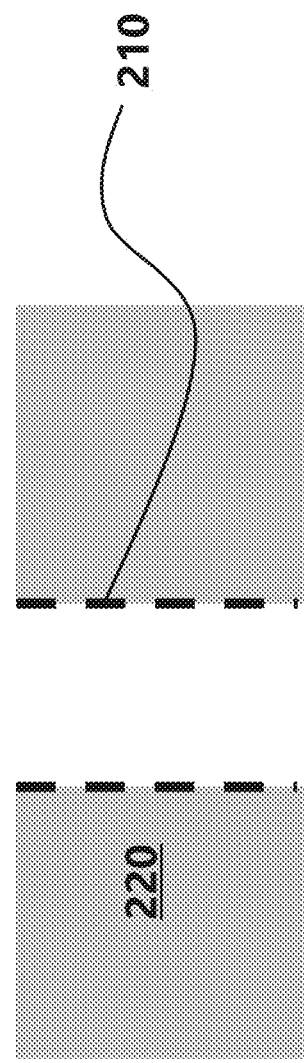
FIG. 2B is a drawing showing a side cross section view of the pore shown in FIG. 2A.

The pores according to the present disclosure are not limited to any particular shape. For example, the pores may be cylindrical or approximately cylindrical. A pore 110 with a circular cross section extending through the strip material 120 is shown in FIGS. 1A and 1B. A pore 210 with an oval cross section extending through the strip material 220 is shown in FIGS. 2A and 2B. A pore with a 310 slit-shaped cross section extending through the strip material 320 is shown in FIGS. 3A and 3B. A pore 410 with an "ink bottle" shape (i.e., with a narrow opening on one side that opens up into a wider opening) extending into the strip material 420 is shown in FIGS. 4A and 4B. Regardless of the pore shape, the pores may pass all the way through the strip material (and thus all the way through the sheath), as shown in FIGS. 1A through 3B, or may pass only partway through the width of the strip material, as shown in FIGS. 4A through 5B. Having the pores pass all the way through the strip material may enhance the outgassing abilities of the pores. Limiting the pores from passing all the way through the strip may enhance the retention of the granular powder flux within the electrode and may allow for further uses of the pores, for example as discussed in more detail below. The pores may comprise a range of different shapes or all be the same approximate shape.

Figure 6:
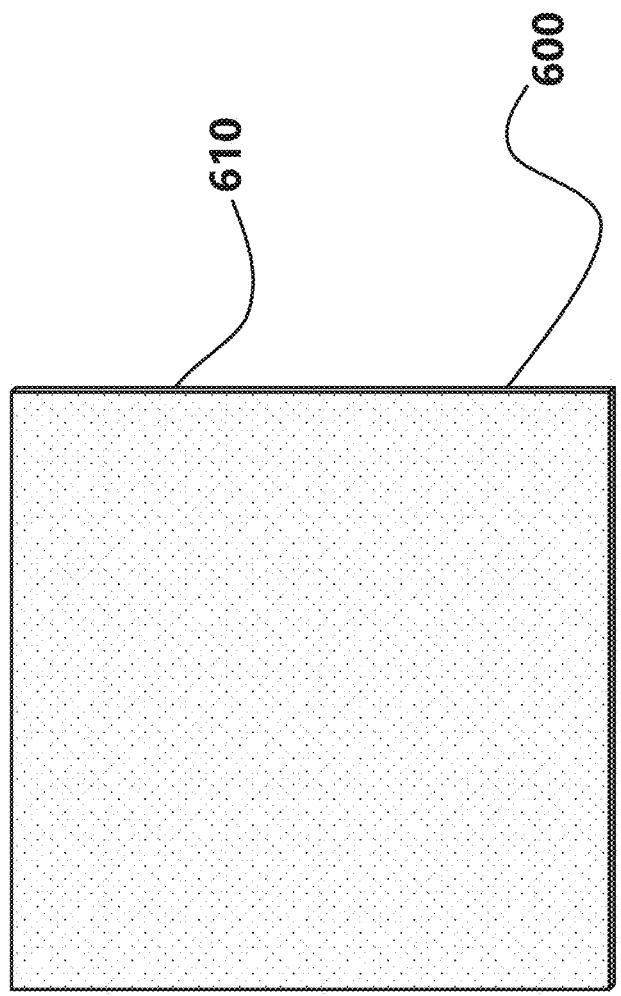
FIG. 6 is a drawing showing a strip of material.

According to as aspect of the present disclosure, an example welding wire electrodes may be manufactured by first providing a strip 600 having a length and opposing planar surfaces (one planar surface 610 is shown in FIG. 6). The strip 600 may contain pores or perforations (micropores or micro-perforations). Alternatively, the strip may not be perforated and the pores or perforations may be added after the welding wire electrode has been formed.

Figure 7:
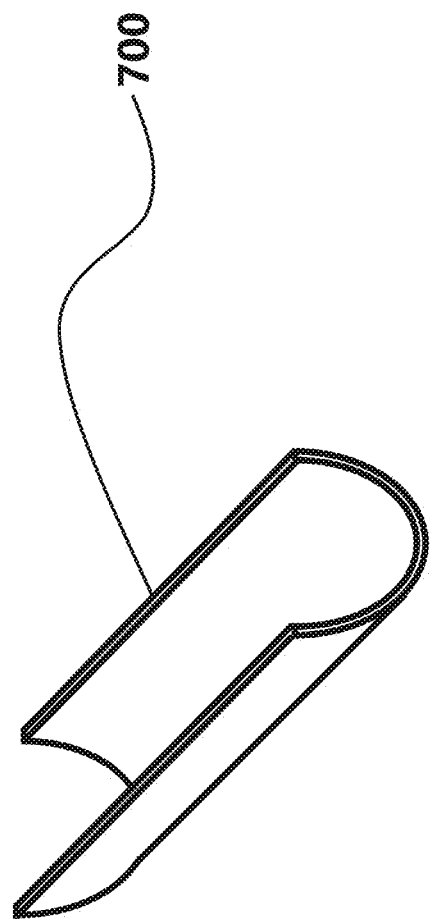
FIG. 7 is a drawing showing a strip of material that has been formed into a "U" shape.
Figure 8:
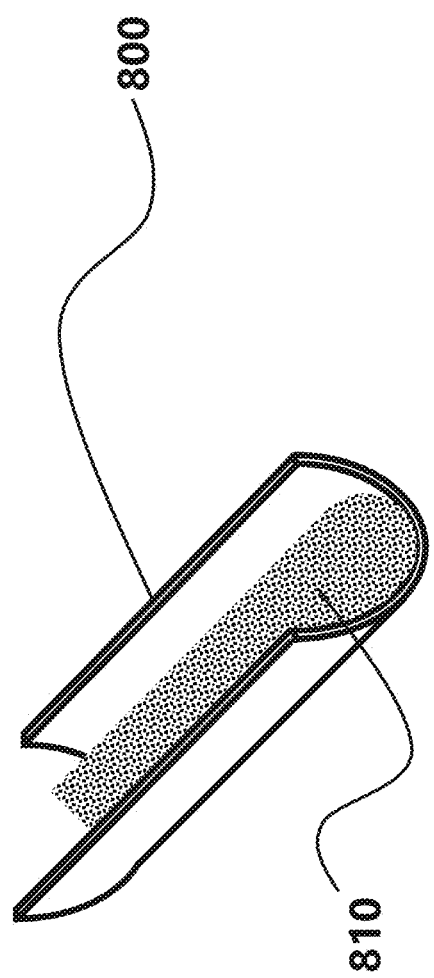
FIG. 8 is a drawing showing the "U" shaped strip filled with a granular flux.
Figure 9:
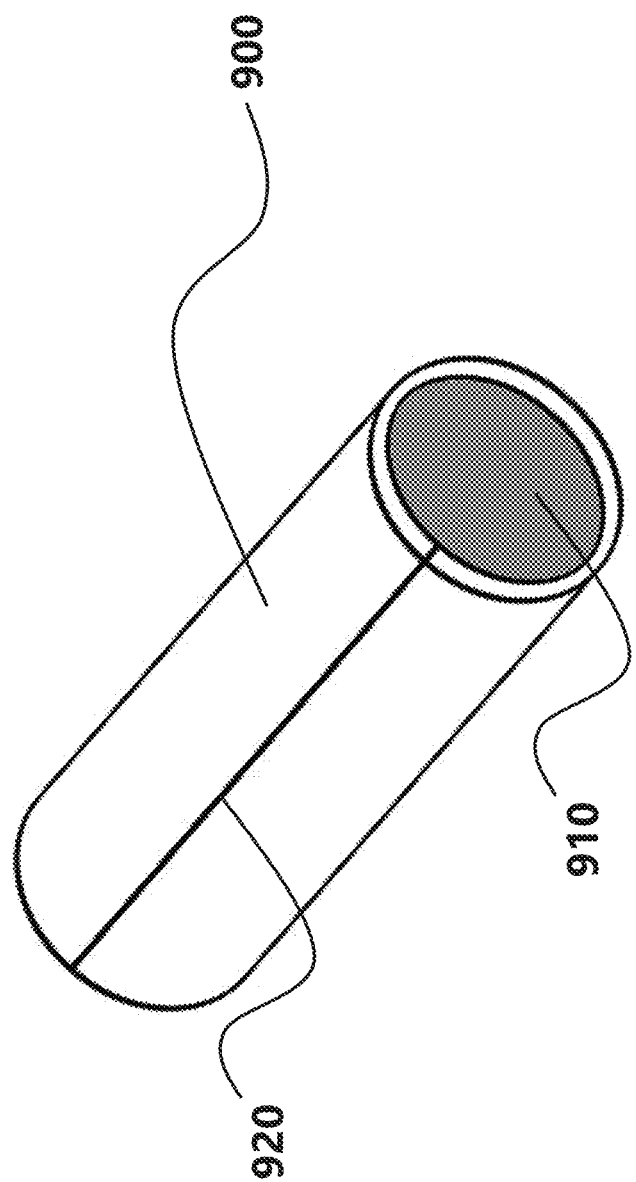
FIG. 9 is a drawing showing the strip formed into a sheath filled with a granular flux and closed with a butt seam.
Figure 10:
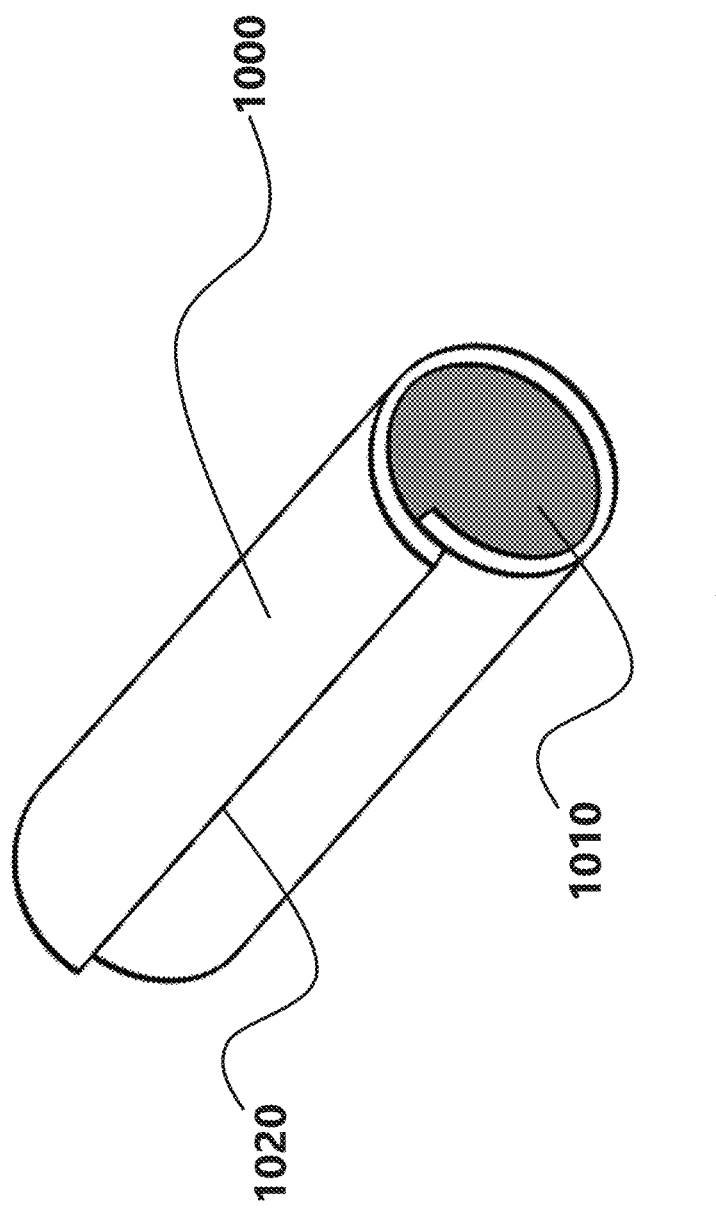
FIG. 10 is a drawing showing the strip formed into a sheath filled with a granular flux and closed with an overlap seam.

An example strip 700 is formed into a "U" shape along the length of the strip, as shown in FIG. 7. A "U" shape may also be referred to as a "C" shape or a semicircular shape. Once in a "U" shape, a strip 800 is filled with a granular flux 810, as shown in FIG. 8. The granular flux may be a granular powder flux or a granular metal flux. After filling, the "U" shape is mechanically closed—for example, via a butt seam 920 or overlap 1020 seam—to form a sheath 900, 1000 that at least substantially (if not fully) encases the granular powder flux 910, 1010, thus forming a tubular welding electrode, as shown in FIGS. 9 and 10. This production method provides an efficient and less expensive route than the conventional seamless process, while still reducing (e.g., preventing) the ability of acids and/or other undesired chemicals from reacting with the granular flux fill core. Seams may be formed by other methods—for example, by laser welding.

Figure 11:
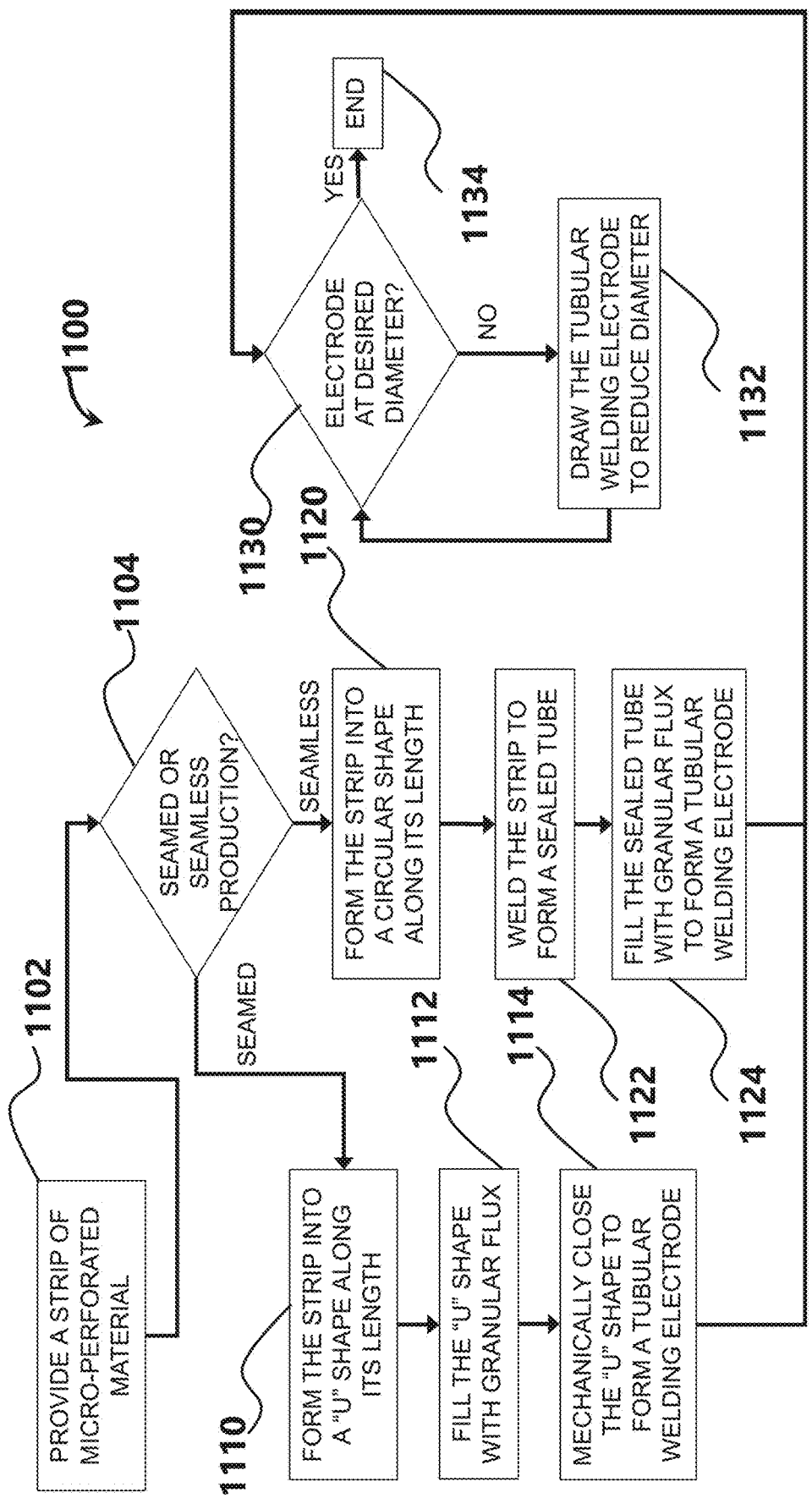
FIG. 11 is a flow chart showing manufacturing methods according to the present disclosure.

Example production methods 1100 are shown in the flow chart in FIG. 11. A strip material is provided 1102. The strip 1100 may contain pores or perforations (micro-pores or micro-perforations). Alternatively, the strip may not be perforated and the pores or perforations may be added after the welding wire electrode has been formed. Seamed or seamless production is selected 1104. For seamed production, the coated strip is formed 1110 into a "U" shape along the length of the strip. Once in a "U" shape, the strip is filled 1112 with a granular flux. After filling, the "U" shape is mechanically closed 1114 to form a sheath that encases the granular powder flux, thus forming a tubular welding electrode. If desired 1130, the tubular welding electrode may be drawn 1132 to reduce the diameter to a desired diameter 1134.

Alternatively, instead of forming the strip into a "U" shape, the strip may be formed into a substantially circular shape along its length 1120. Once in a circular shape, the strip may be welded 1122 along its length to form a sealed tube. The sealed tube can then be filled 1124—for example, by a vibratory filling process—with a granular flux to form a tubular welding electrode. If desired 1130, the tubular welding electrode may be drawn 1132 to reduce the diameter to a desired diameter 1134. For example, a sealed tube or tubular welding electrode with a ⅝ inch diameter may be drawn to a ⅜ inch diameter, or further to a 3/32 inch diameter, or further to a 0.045 inch diameter.

In terms of creating pores in the welding wire electrode, laser drilling or chemical etching are among the possible techniques that may be used. Laser drilling may be used to produce pores in both ferrous and non-ferrous strip alloys that have pore sizes as disclosed in the present disclosure. Chemical etching may also be used on both ferrous and non-ferrous strip alloys. The pores may be created in the strip material prior to forming the strip into a welding wire electrode. Doing so before forming the strip into a welding wire electrode may provide certain manufacturing advantages, such as making it easier to create pores and improving the efficiency of the manufacturing process. Alternatively, the pores may be created in the sheath of the welding wire electrode after the welding wire electrode has been formed.

According to another aspect of the present disclosure, the pores may be positioned for informational purposes. For example, a specific pore pattern (e.g., created by controlled laser drilling) could be created so that it is visible on the exterior of a welding wire electrode. The specific pore pattern can then be scanned or read by a suitable device. The pattern may provide information about, for example, the wire lot, wire type, wire composition, inches of wire, or heating characteristics, or any other information that may be useful.

According to another aspect of the present disclosure, the micro-porous welding wire electrodes disclosed herein may be used to hold a liquid, such as a lubricant. In order to hold lubricant, it may be preferred to limit the depth of the pores so that the pores do not extend through the full width of the strip material. Further, for holding lubricant, it may be advantageous to use pores having an "ink bottle" shape in order to maximize the volume of lubricant that each pore may hold.

According to another aspect of the present disclosure, the micro-porous welding wire electrodes disclosed herein may provide leaching out of copper contained in the granular flux fill core to facilitate improved conductivity with the contact tip during welding.

Some of the elements described herein are identified explicitly as being optional, while other elements are not identified in this way. Even if not identified as such, it will be noted that, in some embodiments, some of these other elements are not intended to be interpreted as being necessary, and would be understood by one skilled in the art as being optional.

While the present disclosure has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, systems, blocks, and/or other components of disclosed examples may be combined, divided, re-arranged, and/or otherwise modified. Therefore, the present disclosure is not limited to the particular implementations disclosed. Instead, the present disclosure will include all implementations falling within the scope of the appended claims, both literally and under the doctrine of equivalents.

The invention claimed is:

1. A tubular welding electrode having a length and a circumference comprising:
   a granular flux fill core extending along the length of the electrode; and
   a sheath having a sheath width and extending along the length of the electrode and surrounding and encasing the granular flux fill core;
   wherein the sheath comprises a plurality of pores that extend from an outer surface at least partially through the sheath width and are distributed around the circumference and along the length of the tubular welding electrode; and
   wherein the pores each have an ink bottle shape with a narrow opening at the outer surface that extends into a larger opening, defining a depth and a partially-enclosed volume for containing a lubricant.

2. The tubular welding electrode of claim 1, wherein the pores have an average pore size of between 1-30 microns.

3. The tubular welding electrode of claim 1, wherein the sheath is a steel material.

4. The tubular welding electrode of claim 1, wherein the sheath is an aluminum material.

5. The tubular welding electrode of claim 1, wherein at least some of the plurality of pores extend only partially through the sheath width and contain a lubricant.

6. A method for producing a tubular welding electrode comprising the steps of:
   a. providing a strip of a metallic material having a length and a width;
   b. creating a plurality of pores extending at least partially through the width of the strip from an outer surface of the strip, wherein the pores each have an ink bottle shape with a narrow opening at the outer surface that extends into a larger opening, defining a depth and a partially-enclosed volume;
   c. forming the strip into a "U" shape along the length;
   d. filling the "U" shape of the strip with a granular powder flux; and
   e. mechanically closing the "U" shape to form a tubular welding electrode having a diameter and containing a core of the granular powder flux.

7. The method of claim 6, wherein the pores have an average pore size of between 1-30 microns.

8. The method of claim 6, further comprising a step f) of drawing the tubular welding electrode to a second diameter, wherein the second diameter is narrower than the diameter.

9. The method of claim 6, further comprising a step g) of baking the tubular welding electrode to allow moisture and hydrocarbons from the granular powder flux to diffuse out of the tubular welding electrode.

10. The method of claim 6, wherein at least some of the plurality of pores extend only partially through the width of the strip and further comprising a step h) of filling at least some of the plurality of pores that extend only partially through the width of the strip with a liquid.

11. The method of claim 6, wherein the creating a plurality of pores of step b) involves laser drilling the strip to create the plurality of pores.

12. The method of claim 6, wherein the creating a plurality of pores of step b) involves chemically etching the strip to create the plurality of pores.

13. The method of claim 6, wherein the mechanical closing of step e) involves forming a butt or overlap seam.

14. A method for producing a tubular welding electrode comprising the steps of:
   a. providing a strip of a metallic material having a length and a width;
   b. creating a plurality of pores extending at least partially through the width of the strip from an outer surface of the strip, wherein the pores each have an ink bottle shape with a narrow opening at the outer surface that extends into a larger opening, defining a depth and a partially-enclosed volume;
   c. forming the strip into a substantially circular shape along the length;
   d. welding the strip to form a tube sealed along the length; and
   e. filling the tube with a granular powder flux to form a tubular welding electrode having a diameter and containing a core of the granular powder flux.

15. The method of claim 14, wherein the pores have an average pore size of between 1-30 microns.

16. The method of claim 14, further comprising a step f) of drawing the tubular welding electrode to a second diameter, wherein the second diameter is narrower than the diameter.

17. The method of claim 14, further comprising a step g) of baking the tubular welding electrode to allow moisture and hydrocarbons from the granular powder flux to diffuse out of the tubular welding electrode.

18. The method of claim 14, wherein at least some of the plurality of pores extend only partially through the width of the strip and further comprising a step h) of filling at least some of the plurality of pores that extend only partially through the width of the strip with a liquid.

19. The method of claim 14, wherein the creating a plurality of pores of step b) involves laser drilling the strip to create the plurality of pores.

20. The method of claim 14, wherein the creating a plurality of pores of step b) involves chemically etching the strip to create the plurality of pores.

* * * * *